US006996442B2

(12) United States Patent
Wickham et al.

(10) Patent No.: US 6,996,442 B2
(45) Date of Patent: Feb. 7, 2006

(54) SYSTEMS AND METHODS FOR DETECTING IMPENDING FAULTS WITHIN CLOSED-LOOP CONTROL SYSTEMS

(75) Inventors: Debbie S. Wickham, Victor, NY (US); Mark A. Scheuer, Williamson, NY (US); Charles P. Coleman, Brighton, NY (US); Ashok V. Godambe, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 334 days.

(21) Appl. No.: 10/342,266

(22) Filed: Jan. 15, 2003

(65) Prior Publication Data
US 2004/0139112 A1 Jul. 15, 2004

(51) Int. Cl.
G05B 9/02 (2006.01)
(52) U.S. Cl. .............................. 700/80; 399/49; 399/53; 358/1.9; 358/520; 430/120
(58) Field of Classification Search ............ 700/80–82; 701/29–33; 702/115; 73/1.38; 399/49, 399/53; 430/120
See application file for complete search history.

(56) References Cited

U.S. PATENT DOCUMENTS

| | | | |
|---|---|---|---|
| 4,155,335 A * | 5/1979 | Hosaka et al. .............. 123/676 |
| 5,260,874 A * | 11/1993 | Berner et al. ................. 701/33 |
| 5,797,064 A | 8/1998 | Raj et al. |
| 5,903,796 A | 5/1999 | Budnik et al. |
| 5,949,677 A * | 9/1999 | Ho .............................. 700/80 |
| 6,014,598 A * | 1/2000 | Duyar et al. .................. 701/29 |
| 6,393,373 B1 * | 5/2002 | Duyar et al. ................ 702/115 |
| 6,629,448 B1 * | 10/2003 | Cvancara .................... 73/1.38 |
| 6,683,737 B2 * | 1/2004 | Gong et al. .................. 360/31 |
| 6,697,582 B1 * | 2/2004 | Scheuer ....................... 399/49 |
| 2002/0152056 A1 * | 10/2002 | Herzog et al. ................. 703/2 |
| 2003/0225466 A1 * | 12/2003 | Yulevitch et al. ............. 700/80 |
| 2005/0027373 A1 * | 2/2005 | Woergoetter et al. ......... 700/19 |

* cited by examiner

*Primary Examiner*—Anthony Knight
*Assistant Examiner*—Sunray Chang
(74) *Attorney, Agent, or Firm*—Oliff & Berridge, PLC

(57) ABSTRACT

An impending fault of a component operated within a closed-loop control system can be detected. The close-loop control system is disabled. An actuator of the closed-loop control system is operated at one or more test values. A sensor reading of the actuator is taken while that actuator is operated at the one or more test values. A warning is generated if an impending fault condition is detected. An impending fault condition may be detected if the component operates at a value exceeding a maximum defined operating value, if the component operates at a value below a minimum defined operating value, or if an operating range that is narrower than a defined full operating range for the component is detected.

19 Claims, 5 Drawing Sheets

SYSTEMS AND METHODS FOR DETECTING IMPENDING FAULTS WITHIN CLOSED-LOOP CONTROL SYSTEMS

BACKGROUND OF THE INVENTION

1. Field of Invention

This invention generally relates to systems and methods for detecting impending faults within closed-loop control systems.

2. Description of Related Art

To achieve consistent operational quality, complex electromechanical systems generally use closed-loop process controls. In an exemplary closed-loop control system, an actuator influences the operation of a component so that the amplitude of an error signal, generated in response to deviations by the actuator from a defined normal condition, is minimized.

Operational quality is defined by the operating space of the system. An operating space is the range of sensor readings around a target value in which nominal operating conditions are maintained.

Changes in the process dynamics, such as environmental changes or aging of the components, may warrant changes in the targets for maintaining the same consistent performance. As a result, the operating space also changes. The process is under control only so long as the targets and the actuators are within the operating space defined by the respective allowable range of variation around their nominal values. This process continues until the system cannot operate within the operating space and a fault is declared.

SUMMARY OF THE INVENTION

As outlined above, in a closed loop system, a fault is generated only after a system is no longer operating within its operating space. As a result, fault prediction is difficult in a closed-loop system because operation of an actuator is automatically adjusted so that the process remains under control. Therefore, a fault is declared only after it occurs. However, when the fault is declared only after it occurs, it is too late to prevent a service call. As a result, machine down time due to the fault, may, and probably will, occur. Thus, expensive machine down-time could be avoided if an impending fault could be anticipated, even under closed loop control, before it occurs.

This invention provides systems and methods that allow impending faults to be detected.

This invention separately provides systems and methods that allow impending faults within a closed-loop control system to be detected.

This invention separately provides systems and methods that operate one or more actuators at various test values and monitor one or more components whose operation is influenced by the operation of the one or more actuators.

This invention separately provides systems and method that generate a warning for an impending fault by periodically monitoring the behavior of one or more actuators and the corresponding targets with respect to the corresponding operating spaces.

This invention separately provides systems and methods for detecting an impending fault of a component that operates within a closed-loop control system.

In various exemplary embodiments of the systems and methods according to this invention, the closed-loop control system is disabled. An actuator influencing the operation of the component is then operated at one or more test values. One or more sensor readings for the component are taken while the actuator is operated at the one or more test values. A warning is generated if an impending fault condition is detected. An impending fault condition may be detected if the component operates at a value exceeding a maximum defined operating value, if the component operates at a value below a minimum defined operating value, or if an operating range that is narrower than a defined full operating range for the component is detected.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The various exemplary embodiments of the systems and methods of this invention detect an impending fault of a component of a system under closed-loop control. In various exemplary embodiments of the invention, the behavior of a target and an actuator with respect to the operating space are periodically monitored. In various exemplary embodiments of the invention, an actuator is operated at one or more test values to determine the operational state of a component. In various exemplary embodiments of this invention, an impending fault condition is detected if a component operates at a level above a defined maximum operating value, if the component operates at a level below a minimum defined operating value, and/or if a range of operating values for the component that is narrower than a defined full operating range is detected. In any of the foregoing situations, a warning may be generated.

Figure 1:
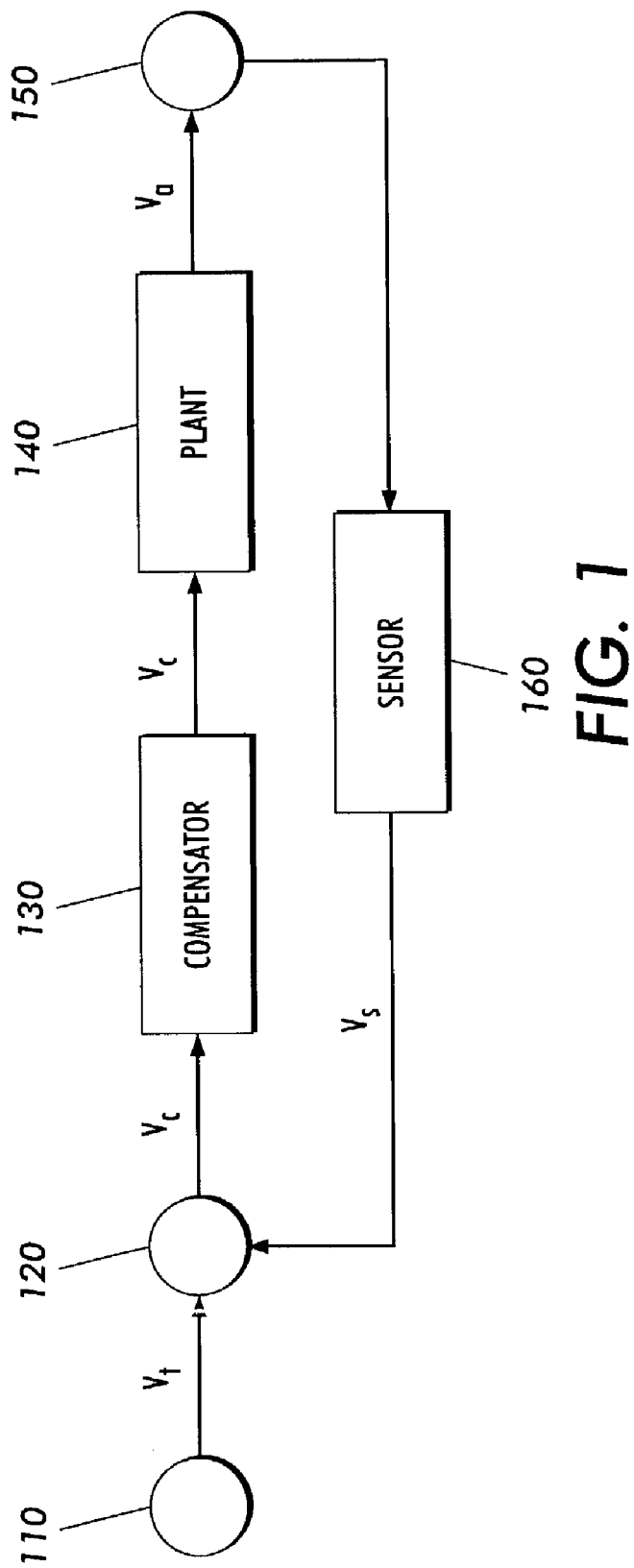
FIG. 1 is a block diagram of an exemplary embodiment of a closed-loop control system for controlling the command position of a target within a predefined space according to the invention.

FIG. 1 shows a conventional closed-loop control system 100 usable to control the command position of a target within a predefined operating space. As shown in FIG. 1, the closed-loop control system 100 includes a target value 110, an error signal generator 120, a compensator 130, a plant 140, an actuator 150, and a sensor 160. The target value 110 is an input to the control system 100. The target value 110 represents a desired value $V_t$ for the operation of the actuator 150.

The actuator 150 may be any component operated within a closed-loop control system. In various exemplary embodiments, the actuator may be electrical, mechanical, pneumatic or hydraulic in operation.

The error signal generator 120 inputs the target value 110 (i.e., the desired value $V_t$) and a feedback or sensor signal $V_s$ from the sensor 160 and generates an error signal $V_e$. The error signal $V_e$ is input into the compensator 130. The error signal $V_e$ is produced by comparing the feedback or sensor signal $V_s$ to the target value 110.

The compensator 130 inputs the error signal $V_e$ and outputs an adjusted error signal, or comparator signal $V_c$, that is usable to control the operation of one or more components in the plant 140, such as a power supply. In various exemplary embodiments, the plant 140 is an electromechanical device, such as a xerographic copier. The plant 140 produces an output driving signal $V_a$ that is usable to drive or operate the actuator 150. As the actuator 150 is driven or actuated by the driving signal $V_a$, the value of at least one parameter of the actuator 150 is read by the sensor 160. The sensor 160 is any sensor that can be used to measure a particular parameter of interest of the actuator 150.

The sensor 160 converts the sensed parameter into the sensor signal $V_s$. In particular, based on the transfer function implemented in the sensor 160, an amplitude, a frequency, a value of an effort or flow variable, and/or a value of a power variable of the sensor signal will vary based on the sensed value of the sensed parameter. For example, when the sensor 160 outputs an electrical signal in response to the sensed parameter of the actuator 160, the value of the voltage, the current, the frequency, the phase and/or the wattage of the sensor signal can vary in response to the value of the sensed parameter.

In various exemplary embodiments, the error signal generator 120 may be a simple on-off control system. In this embodiment, when the sensor 160 detects operation of the value of the actuator 150 below the target value $V_t$ 110, the actuator 150 is operated by the error signal $V_c$ until the detected parameter increases above the target value $V_t$ 110. At this time, operation of the actuator 150 terminates. In various exemplary embodiments, the turn-on and turn-off values for the actuator 150 differ by a small amount, the hysteresis, to prevent noise from switching the actuator 150 rapidly and unnecessarily when the detected parameter is near the target value $V_t$ 110.

In various exemplary embodiments, the error signal generator 120 may exert proportional control over the actuator 150 by applying a driving signal $V_a$ to the actuator 150 in proportion to the difference between the sensor signal $V_s$ and the target value $V_t$ 110:

$$V_a = P(V_s - V_t), \quad (1)$$

where P is the proportional gain of the compensator 130.

In various exemplary embodiments, the error signal generator 120 may control the actuator 150 utilizing proportional-differential PD control. In these exemplary embodiments, a term proportional to the time-derivative of the error signal is added to the control equation. That is, the value of the error signal $V_a$ is determined as:

$$V_a = P\left((V_s - V_t) + D\frac{d}{d_t}(V_s - V_t)\right), \quad (2)$$

where D is a damping constant.

The value of the damping constant, D, can be adjusted to achieve a critically-damped response to changes in the target value $V_t$ 110. In a critically-damped system, a positive initial displacement decays to a negligible level after about one normal period, $T_n$.

In various exemplary embodiments, the error signal generator 120 may utilize a proportional-integral-differential (PID) control. That is, the value of the error signal $V_a$ is determined as:

$$V_a = \left((V_s - V_t) + D\frac{d}{d_t}(V_s - V_t) + I\int(V_s - V_t)d_t\right), \quad (3)$$

where I is the integral gain parameter.

The integral gain parameter I, serves to change the signal until the time-averaged value of the signal error is 0. A proportional-integral-differential controller is useful to reduce steady-date error in the controller response. It should be appreciated that any known or later-developed closed-loop control system may be used to control the actuator operation.

Figure 2:
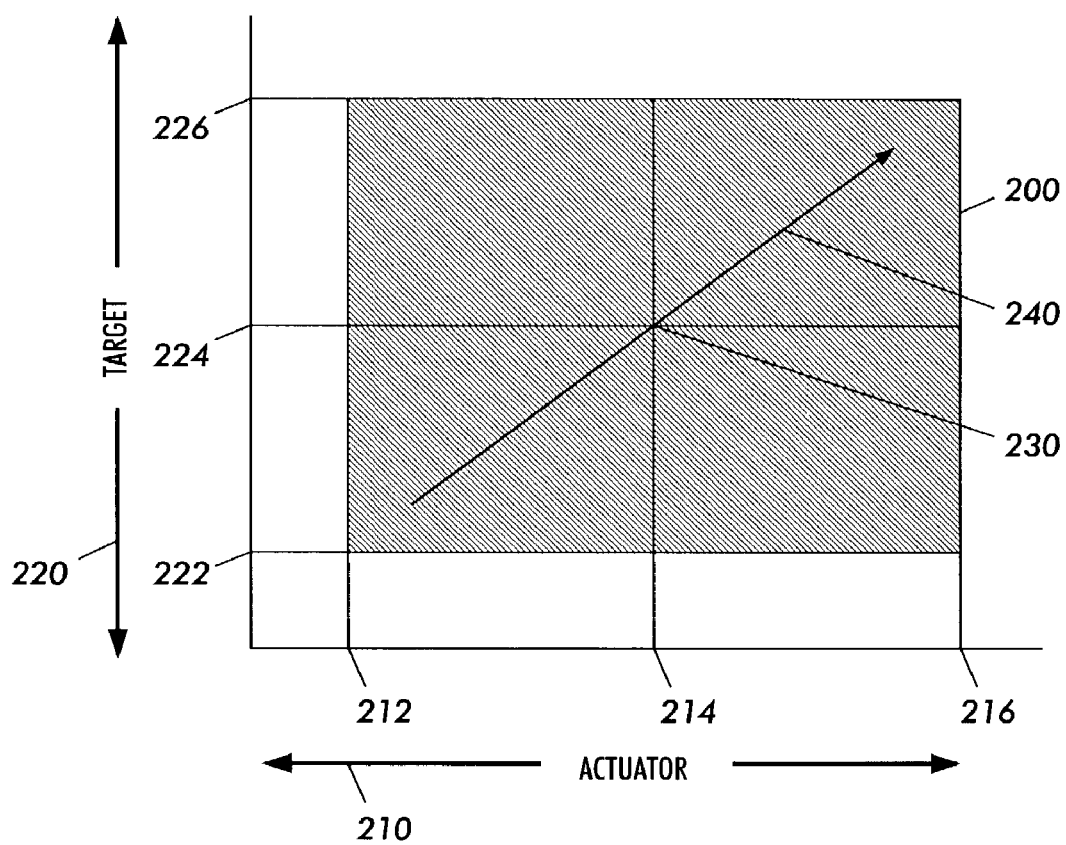
FIG. 2 is a graph illustrating a relationship between a target variable and an actuator variable, according to various exemplary embodiments of the invention.

FIG. 2 illustrates one exemplary embodiment of an operating space 200 usable by the closed-loop control system 100 shown in FIG. 1. As shown in FIG. 2, the operating space 200 comprises a target axis ($V_t$) 220 and an actuator value ($V_a$) axis 210. The target axis 220 defines a target operating space in which the target value of the target signal $V_t$ 110 is allowed to vary. The actuator axis 270 defines an actuator target space in which the value of the driving signal $V_a$ is allowed to vary. The operating space 200 is bound by a lower actuator limit 212 and an upper actuator limit 216, and a lower target limit 222, and an upper target limit 226. With respect to an actuator 150 within an image forming device, the operating space defines a range of sensor readings around the target in which a desired image quality is maintained.

The relationship between the target value $V_t$ 110 and the values of the driving signal $V_a$ is defined by a function 240. A linear function is illustrated in FIG. 2.

It should be appreciated that any desired function can be used. In various exemplary embodiments of the invention, the function 270 is generally monotonic. An initial setting 230 is defined by a nominal actuator value 214 and a nominal target value 244.

In systems where an actuator 150 has a static target value $V_t$ 110, the lower and upper target values 222 and 226 are equivalent to the nominal target value. In systems where the target value $V_t$ 110 can itself change over time, the lower and upper target values 222 and 226 are generally defined by physical parameters that ensure that the apparatus on which the control system 100 resides will not damage itself and/or by the effects the target value 110 may have on upstream and/or downstream actuators.

Similarly, the lower and upper actuator values 212 and 216 are generally defined by physical parameters that ensure that the operation of an actuator relative to one or more target values $V_t$ 110 does not damage the apparatus on which the control system 100 resides.

When either the target value $V_t$ 110 and/or the value of the driving signal $V_a$ extends outside of the operating space 200, a fault occurs. The target value $V_t$ 110 may move to a point outside of the operating space 200 due to aging of and/or a failure in a device, structure or apparatus of the apparatus in which the control system 100 resides that is used to set the target value Vt 110 for the actuator 150. The value of the driving signal $V_a$ may move to a point outside of the operating space 200 due to aging of and/or a failure in the actuator 150. For example, if the actuator 150 is a drive roller, and the value of the driving signal $V_a$ is drive motor rotational speed, a fault in a bearing of the drive roller may make the drive roller harder to drive. If the sensed value is the rotational speed of the drive roller, the error signal value $V_e$ will represent the difference in the desired or target and actual rotational speeds. The value of the driving signal $V_a$ will then increase to drive the drive roller harder in an attempt to increase its rotational speed. However, if the value of the driving signal $V_a$ exceeds an upper bound that represents the safe drive current that can be output by a drive circuit to or the drive current that can safely be input to the drive motor, a fault has occurred.

Figure 3:
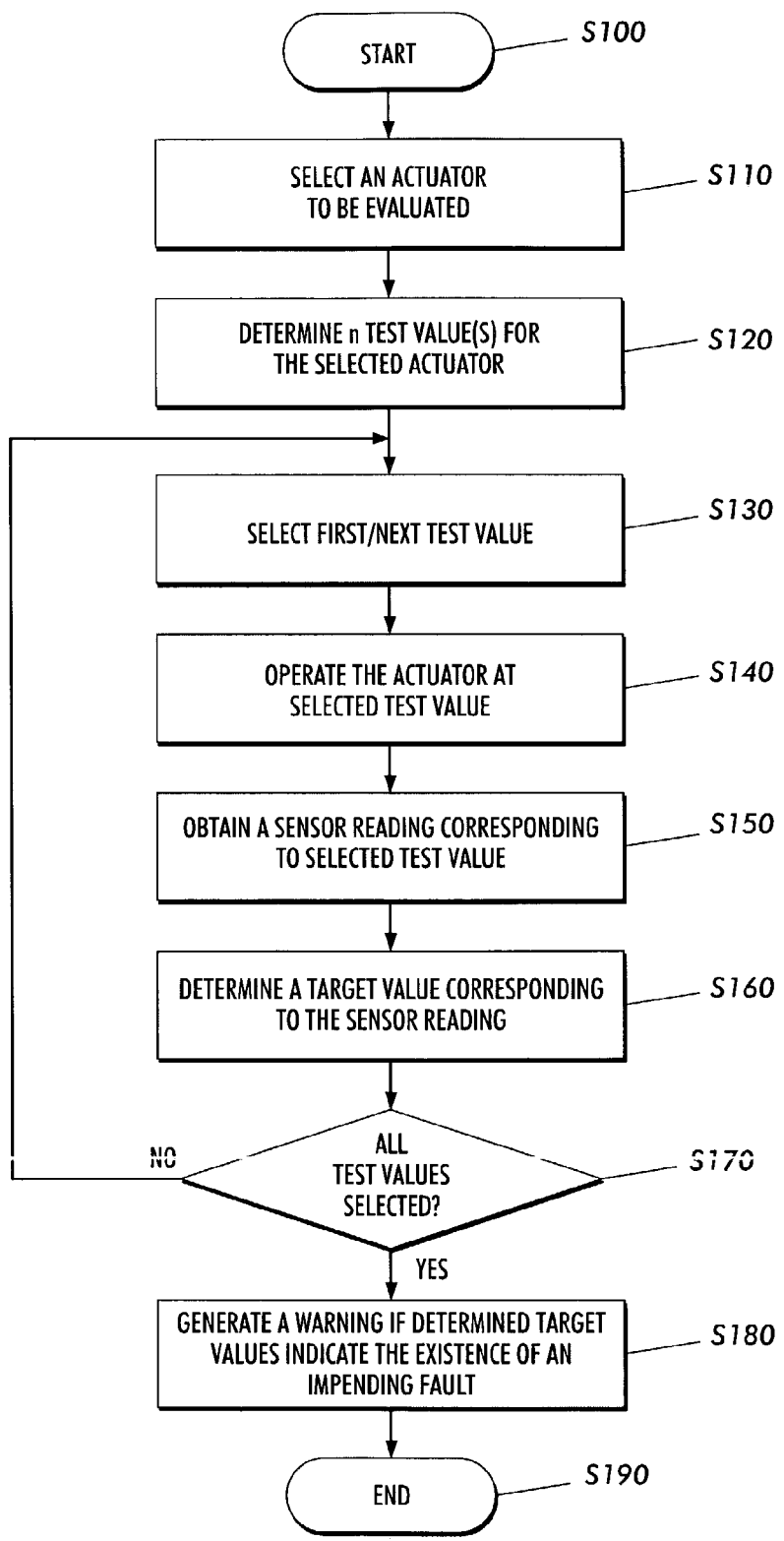
FIG. 3 is a flowchart outlining an exemplary embodiment of a method for detecting an impending fault within a closed-loop control system according to this invention.

FIG. 3 is a flowchart outlining an exemplary embodiment of a method for detecting an impending fault within a closed-loop control system according to this invention. As shown in FIG. 3, the method starts in step S100, and continues to step S110, where an actuator to be evaluated is selected. Then, in step S120, n values to be tested for the selected actuator are determined. In various exemplary embodiments of the invention, the test values are stored in and retrieved from a database. In various exemplary embodiments of the invention, the test values are determined in real time, for example, from an input of an operator of the apparatus on which the control system 100 resides. Next, in step S130, a first or next value to be tested is selected. Operation then continues to step S140.

In step S140, the selected actuator is operated at the selected test value. Next, in step S150, a sensor reading corresponding to the selected test value is obtained. Then, in step S160, a target value corresponding to the sensor reading is determined. Operation then continues to S170. In various exemplary embodiments of the invention, the determined target value is stored, for example, in a database, for later analysis.

In step S170, a determination is made whether all determined test values have been selected. If so, operation continues to step S180. Otherwise, operation jumps back to step S130. In step S180, a warning is generated if the determined target values indicate the existence of an impending fault. In various exemplary embodiments, a fault condition exists if any target value falls outside the operating space. In various other exemplary embodiments, a fault condition exists if one or more target values indicate an operating range narrower than in a defined full operating range for the component. Operation then continues to step S190, where operation of the method ends.

It should be appreciated that in various exemplary embodiments of the invention, multiple sensors may be selected to monitor multiple parameters of the selected actuator. In various exemplary embodiments of the invention, the selected actuator may be tested in two or more dimensions of operation. Additionally, in various exemplary embodiments of the invention, the interaction of two or more actuators may be tested in one or more operating spaces.

Figure 4:
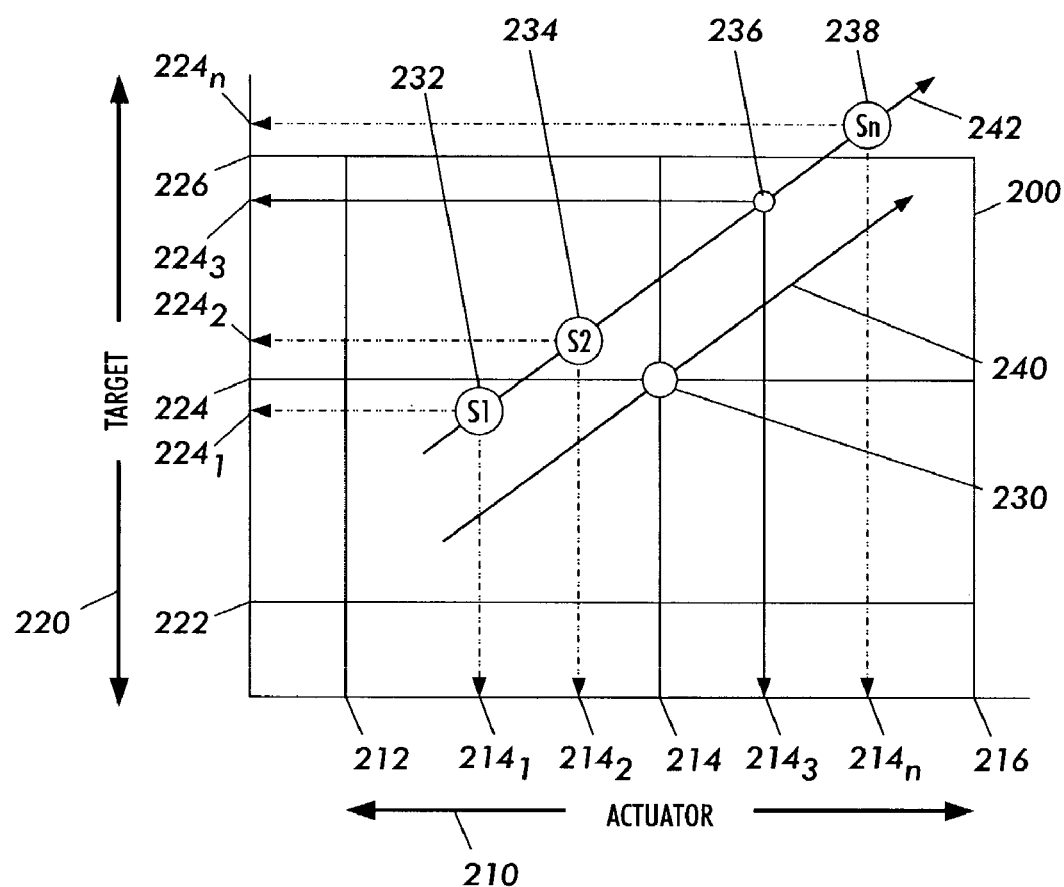
FIG. 4 is a graph illustrating a relationship between an actuator variable and a target variable in which an impending fault condition exists, according to various exemplary embodiments of the invention.

FIG. 4 is a graph outlining one exemplary embodiment of a relationship between an actuator variable and a target variable that is indicative of an impending fault condition according to various exemplary embodiments of the invention. As shown in FIG. 4, a function 240 defines an initial relationship between the target values $V_t$ 110 and the values of the driving values $V_a$. An initial setting 230 is defined by a nominal value 214 of the driving signal and a nominal target value 244.

In FIG. 4, an impending fault condition is indicated by the dynamics of the time series of operating points 232–238 shown with a revised function 242 defining a process shift.

As the closed-loop system degrades, the revised function 242 defines a new relationship between the target values $V_t$ 110 and the values of the driving signal $V_a$. A new nominal setting 236 is defined by a new nominal value $214_3$ of the driving signal $V_a$, and a new nominal target value $224_3$.

The function 242 also defines n operating values, $S_1$, $S_2$, ..., $S_n$. Each actuator value $214_1$, $214_2$ and $214_3$ of the driving signal $V_a$ defines a target value $224_1$, $224_2$, and $224_3$, respectively. As shown in FIG. 4, the actuator value $214_n$ corresponds to a target value $224_n$ that lies beyond the upper target limit 226. Thus, the operating value $S_n$ indicates an impending fault within the closed-loop control system 100. In this case, the operating value $S_n$ indicates that the actuator cannot cover the operating space. Therefore, a warning should be generated about the impending problem.

As the system degrades, the values of the driving signal $V_a$ are changed to accommodate the process shift. The new setting 236 indicates that the closed-loop control system 100 is still operating within the operating space 200. Selecting one or more values of the driving signal $V_a$ focuses the analysis on the actuator range itself. The analysis runs through the actuator space so that a determination can be made whether the target space falls within the operating space 200.

Figure 5:
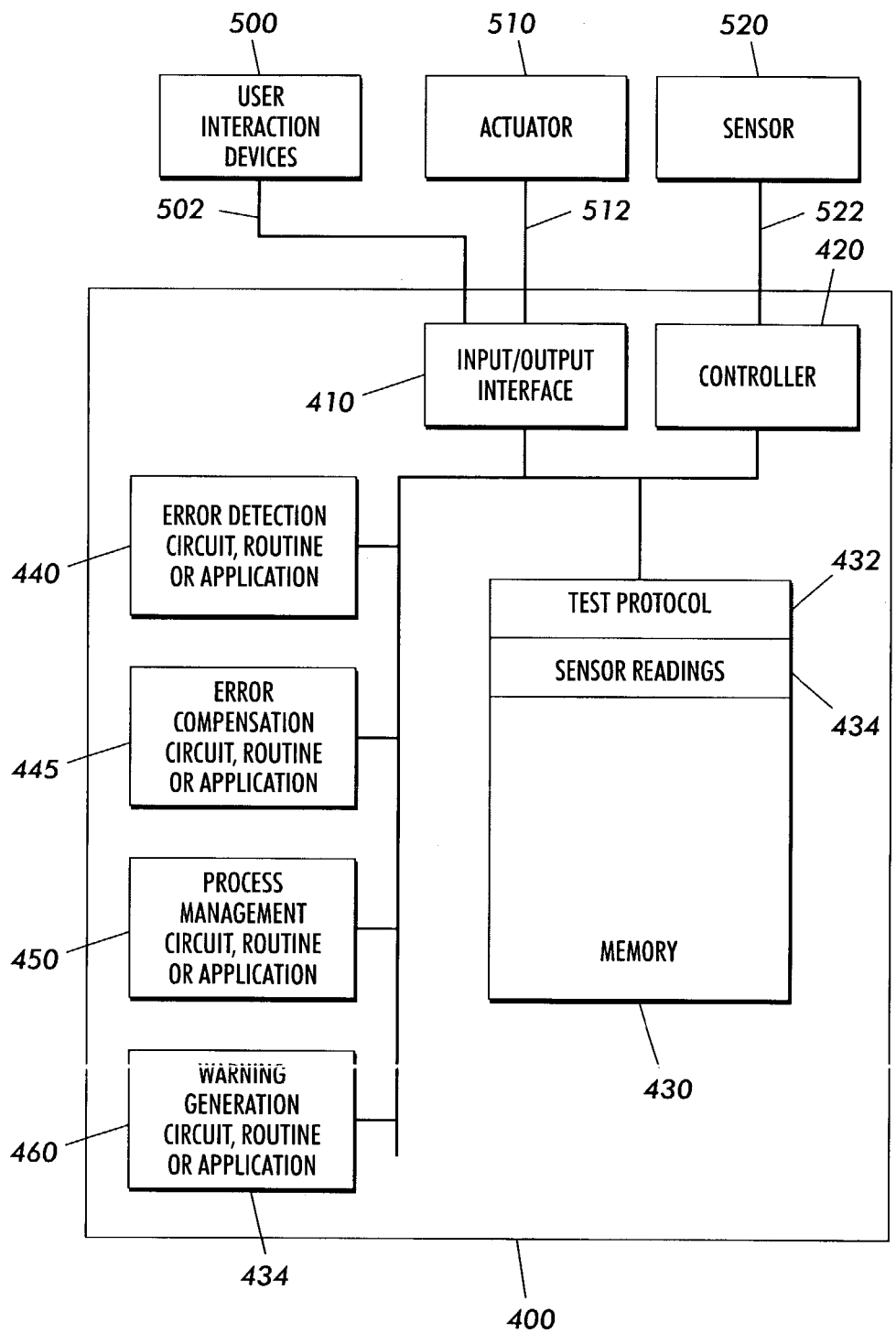
FIG. 5 is a block diagram illustrating one exemplary embodiment of an impending fault detection system in accordance with various exemplary embodiments of the invention.

FIG. 5 shows a block diagram of one exemplary embodiment of an impending fault detection system 400 according to this invention. As shown in FIG. 5, the impending fault detection system 400 includes an input/output interface 410, a controller 420, a memory 430, an error detection circuit, routine or application 440, an error compensation circuit, routine or application 445, a process management circuit, routine or application 450, and a warning generation circuit, routine or application 460, each interconnected by one or more data and/or control busses or application programming interfaces 470. As shown in FIG. 5, one or more user interaction devices 500 are connected over one or more links 502 to the input/output interface 410. Additionally, an actuator 510 is connected to the input/output interface 410 over a link 512. Likewise, a sensor 520 is connected to the input/output interface 410 over a link 522.

Each of the links 502, 512 and 522 can be implemented using any known or later-developed device or system usable to connect the corresponding one or more user interaction devices 500, the actuator 510, and the sensor 520, respectively, to the input/output interface 410 of the impending fault detection system 400, including a direct cable connection, a connection over a wide area network, a connection over an intranet, a connection over the Internet, or a connection over any other distributed processing network or system.

The input/output interface 410 inputs data from the actuator 510, the sensor 520 and/or the one or more user interaction devices 500 and outputs data to the actuator 510 and/or the one or more user interaction devices 500. The input/output interface 410 also outputs data to, and/or receives data from, one or more of the controller 420, the memory 430, the error detection circuit, routine or application 440, the error compensation circuit, routine or application 445, the process management circuit, routine or application 450, and/or the warning generation circuit, routine or application 460.

The memory 430 includes one or more of a test protocol portion 432 and a sensor readings portion 434. In various exemplary embodiments, the test protocol portion 432 is a database of actuator identifiers, actuator values and target values usable when testing the closed-loop control system.

In various exemplary embodiments, the sensor readings portion 434 is a database of the results of testing the closed-loop control system. In various exemplary embodiments, the memory 430 also stores one or more control routines used by the controller 420 to operate the impending fault detection system 400.

The memory 430 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

It should be understood that each of the circuit, routine or applications shown in FIG. 5 can be implemented as physically distinct hardware circuits within an ASIC, or using an FPGA, a PDL, a PLA or a PAL, a digital signal processor, or using discrete logic elements or discrete circuit elements. The particular form each of the circuits or routines shown in FIG. 5 will take is a design choice and will be obvious and predictable to those skilled in the art.

By means of an example for the various exemplary embodiments of this invention, in xerographic controls, it is necessary to charge a photoreceptor so that the photoreceptor will attract toner particles. The optimum charge for the photoreceptor is, for example, 250 volts. However, the charging process for the photoreceptor is defined as nominal if the photoreceptor is charged as low as 200 volts or as high as 300 volts. A charge below 200 volts or above 300 volts indicates, for example, that the process is broken.

The photoreceptor receives its charge from a grid voltage on a power supply. For example, the power supply has a voltage range between 500 volts and 1000 volts. Thus, a fault may be declared if, in the process of attempting to charge the photoreceptor to 250 volts, the power supply falls below 500 volts or rises above 1000 volts. A fault may be declared because these values are outside of the range of the power supply. A method for the identification of faults in xerographic controls is disclosed in U.S. Pat. No. 5,903,796, assigned to the same assignee as the present invention, incorporated herein.

An impending fault may be detected if the photoreceptor and power supply are charging within their respective voltage ranges, but one or both systems are operating close to their operating space boundaries. Thus, if the photoreceptor is properly charged to 200 volts, but the power supply is charged at 900 volts, then both systems are operating normally. However, an impending fault condition may exist.

In accordance with various exemplary embodiments of this invention, an impending fault condition is detected by first running the power supply from 500 volts to 1000 volts in a series of test values. Next, sensor readings are taken at each test value. The sensor readings are indicative of a photoreceptor charge. If, for example, a power supply is run at between 500 volts to 1000 volts, and the photoreceptor correspondingly charges at between 200 volts and 300 volts, then an impending fault condition is not indicated because both systems cover the full range of values. However, if either system cannot cover an entire range of values, then an impending fault may be indicated with respect to this system.

While this invention has been described in conjunction with the exemplary embodiments outlined above, it is evidenced that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for detecting an impending fault of a component operated within a closed-loop control system, comprising:
    disabling the closed-loop control system;
    selecting a value of a parameter for an actuator from a set of values of the parameter, the set of values defining a first operational range of the parameter, each of the set of values corresponding to a respective one in a set of values of a parameter for the component based on a predefined relationship, the first operational range corresponding to a second operational range, the second operational range defined by the set of values of the parameter for the component, the second range including a maximum value and a minimum value, the minimum value smaller than the maximum value;
    operating the actuator at the selected value;
    obtaining a sensor reading from a sensor monitoring the component while the actuator is operating at the selected value;
    determining whether the sensor reading is indicative of an impending fault condition of the component; and
    generating a warning if the sensor reading is indicative of the impending fault condition.

2. The method of claim 1, wherein the fault condition comprises operating the component at a value exceeding a defined maximum operating value for the component.

3. The method of claim 1, wherein the fault condition comprises operating the component at a value below a defined minimum operating value for the component.

4. The method of claim 1, wherein the fault condition comprises at least one of an occurrence of a current detected operating range defined by an upper operating value being lower than a defined maximum operating value and an occurrence of the current selected operating range defined by a lower operating value being higher than a defined minimum operating value.

5. The method of claim 1, further comprising:
    selecting another value from the set of values of the parameter for the actuator to operate at, if there remains at least one value in the set of values of the parameter that has not been selected.

6. The method of claim 1, the determining step comprising:
    determining whether the sensor reading is above the maximum value of the second range;
    determining whether the sensor reading is below the minimum value of the second range; and
    establishing the impending fault condition when the sensor reading is above the maximum value or below the minimum value of the second range.

7. A system usable to detect an impending fault of a component operated within a closed-loop control system, the closed-loop control system comprising:
    an actuator usable to drive the component; and
    a sensor usable to determine an operational state of the component, wherein the system comprises:
    an error detection circuit, routine or application that detects an impending fault condition of the component based on a reading of the sensor, wherein a sensor reading is taken using the sensor while the actuator is being operated at a selected value of a parameter, the selected value being selected from a set of values of the parameter, the set of values defining a first operational range of the parameter, each of the set of values corresponding to a respective one in a set of values of a parameter based on a predefined relationship for a component monitored by the sensor, the first operational range corresponding to a second operational range defined by the set of values of the parameter for the component, the second range including a maximum value and a minimum value, the minimum value smaller than the maximum value; and a warning generation circuit, routine or application that generates a warning if an impending fault condition is detected by the error detection circuit, routine or application.

8. The system of claim 7, wherein the error detection circuit, routine or application detects an impending fault condition when the sensor detects the component operating at a value below a defined minimum operating value for the component.

9. The system of claim 7, wherein the error detection circuit, routine or application detects an impending fault condition when the sensor detects the component operating at a value exceeding a defined maximum operating value for the component.

10. The system of claim 7, wherein the error detection circuit, routine or application detects an impending fault condition when at least one of a current operating range defined by an upper operating value that is lower than a defined maximum operating value is detected and a current operating range defined by a lower operating value that is higher than a defined minimum operating value is detected.

11. The system of claim 7, further comprising:
a first database that stores at least one value for the component or one value for the actuator; and
a second database usable to store at least one sensor reading, wherein each stored sensor reading is indicative of an operational state of the component as the actuator is operated at one of the at least one stored value.

12. The system of claim 7, wherein the error detection circuit, routine or application selects another value from the set of values of the parameter for the actuator to operate at, if there remains at least one value in the set of values of the parameter that has not been selected.

13. The system of claim 7, wherein the error detection circuit, routine or application determines whether the sensor reading is above the maximum value of the second range, determines whether the sensor reading is below the minimum value of the second range, and establishes the impending fault condition if the sensor reading is above the maximum value or below the minimum value of the second range.

14. A computer program product, comprising:
a computer usable medium having computer readable program code embodied therein for causing a detection of an impending fault of a component operated within a closed-loop control system, the computer readable program code in said computer program product comprising:
computer readable program code for causing a computer to disable the closed-loop control system;
computer readable program code for causing a computer to select a value of a parameter for an actuator from a set of values of the parameter, the set of values defining a first operational range of the parameter, each of the set of values corresponding to a respective one in a set of values of a parameter for the component based on a predefined relationship, the first operational range corresponding to a second operational range, the second operational range defined by the set of values of the parameter for the component, the second range including a maximum value and a minimum value, the minimum value smaller than the maximum value;
computer readable program code for causing a computer to operate the actuator at the selected value;
computer readable program code for causing a computer to obtain a sensor reading from a sensor monitoring the component while the actuator is operating at the selected value;
computer readable program code for causing a computer to determine whether the sensor reading is indicative of an impending fault condition of the component; and
computer readable program code for causing a computer to generate a warning if the sensor reading is indicative of the impending fault condition.

15. The computer program product of claim 14, wherein the fault condition comprises operating the component at a value exceeding a defined maximum operating value for the component.

16. The computer program product of claim 14, wherein the fault condition comprises operating the component at a value below a defined minimum operating value for the component.

17. The computer program product of claim 14, wherein the fault condition comprises at least one of an occurrence of a current detected operating range defined by an upper operating value being lower than a defined maximum operating value and an occurrence of the current selected operating range defined by a lower operating value being higher than a defined minimum operating value.

18. The computer program product of claim 14, further comprising:
computer readable program code for selecting another value from the set of values of the parameter for the actuator to operate at, if there remains at least one value in the set of values of the parameter that has not been selected.

19. The computer program product of claim 14, wherein the computer-readable program code for causing a computer to determine whether the sensor reading is indicative of an impending fault condition comprises:
computer-readable program code for causing the computer to determine whether the sensor reading is above the maximum value of the second range;
computer-readable program code for causing the computer to determine whether the sensor reading is below the minimum value of the second range;
computer-readable program code for causing the computer to establish the pending fault condition if the sensor reading is determined to be above the maximum value of the second range or if the sensor reading is determined to be below the minimum value of the second range.

* * * * *